(12) United States Patent
Ho et al.

(10) Patent No.: US 6,890,473 B2
(45) Date of Patent: May 10, 2005

(54) ALIGNMENT COLLAR FOR A NOZZLE

(75) Inventors: Nin Ho, Georgetown (CA); Hans Guenther, Georgetown (CA)

(73) Assignee: Mold-Masters Limited, Ontario (CA)

( * ) Notice: Subject to any disclaimer, the term of this patent is extended or adjusted under 35 U.S.C. 154(b) by 158 days.

(21) Appl. No.: 10/232,619

(22) Filed: Sep. 3, 2002

(65) Prior Publication Data
US 2004/0043102 A1 Mar. 4, 2004

(51) Int. Cl.[7] .............................................. B29C 45/20
(52) U.S. Cl. ................................... 264/328.1; 425/567
(58) Field of Search ........................ 425/567; 264/328.1

(56) References Cited

U.S. PATENT DOCUMENTS

| 4,173,448 A | 11/1979 | Rees et al. |
| 4,268,241 A | 5/1981 | Rees et al. |
| 4,279,588 A | 7/1981 | Gellert |
| 4,344,750 A | 8/1982 | Gellert |
| 4,433,969 A | 2/1984 | Gellert |
| 4,588,367 A | 5/1986 | Schad |
| 4,662,837 A | 5/1987 | Anderson |
| 4,682,945 A | 7/1987 | Schad |
| 4,837,925 A | 6/1989 | Gellert |
| 5,235,737 A | 8/1993 | Gellert |
| 5,614,233 A | 3/1997 | Gellert |
| 5,896,640 A | 4/1999 | Lazinski et al. |
| 6,062,846 A | 5/2000 | Kalemba |
| 6,162,043 A | 12/2000 | Gellert |
| 6,261,084 B1 | 7/2001 | Schmidt |
| 6,287,107 B1 * | 9/2001 | Kazmer et al. ............. 425/562 |
| 6,309,207 B1 * | 10/2001 | Kalemba ..................... 425/549 |

* cited by examiner

*Primary Examiner*—Jill L. Heitbrink
(74) *Attorney, Agent, or Firm*—Sterne, Kessler, Goldstein and Fox P.L.L.C.

(57) ABSTRACT

A collar for a hot runner nozzle of an injection molding apparatus includes a generally cylindrical body having a first flange extending inwardly from a first end thereof. The first flange is provided to abut a nozzle head and at least a portion of a nozzle body of a nozzle. An alignment flange projects from an inner wall of the generally cylindrical body and is spaced from the first flange. The alignment flange contacts the nozzle body to restrict tipping of the collar relative to the nozzle during assembly of the injection molding apparatus.

19 Claims, 12 Drawing Sheets

ALIGNMENT COLLAR FOR A NOZZLE

FIELD OF THE INVENTION

The present invention relates generally to an injection molding apparatus and, in particular, to a collar for a hot runner nozzle that improves the alignment of the nozzle during assembly and operation in an injection molding apparatus.

BACKGROUND OF THE INVENTION

In general, a hot runner nozzle includes a nozzle tip, a nozzle body and a nozzle head. A nozzle collar, or flange, is provided to locate the nozzle body relative to the mold plate that surrounds the nozzle. The collar may be integral with the nozzle, or alternatively, the collar may be a separate part that is either coupled to the nozzle or movable relative to the nozzle.

Proper alignment of the components of an injection molding apparatus is critical for the production of quality molded parts. If the hot runner nozzle is not properly aligned with the mold gate, sealing or gating may be adversely affected. In thermal gating applications, alignment of the nozzle tip with the mold gate is important in order to prevent leakage of the molten material. In valve gated applications, alignment of the nozzle tip with the mold gate is important because the valve pin, which is slidable through the nozzle, must be properly aligned with the mold gate in order to close the gate effectively.

Installation and alignment of a nozzle with an integrated collar is relatively simple because there is no movement between the parts. Reference is made to U.S. Pat. Nos. 4,173,448 and 4,268,241 to Rees; U.S. Pat. No. 4,433,969 to Gellert; U.S. Pat. No. 4,588,367 to Schad; U.S. Pat. No. 4,662,837 to Anderson and U.S. Pat. No. 6,062,846.

In applications where the collar is a separate part, the collar is typically coupled to the nozzle by a suitable means such as brazing, for example. An advantage of this arrangement over an integrated collar is that the separate collar may be comprised of a different material than the nozzle. By making the collar from a less thermally conductive material than the nozzle, the heat loss from the nozzle to the cold mold plates of the injection molding apparatus is reduced. The separate collar provides a further advantage in that it may be manufactured more quickly and more precisely than the integrated collar. Similar to the nozzle with the integrated collar, this nozzle and collar arrangement is easily assembled in an injection molding apparatus because there is no relative movement between the parts. Reference is made to U.S. Pat. Nos. 4,279,588, 4,344,750, 4,837,925 and 6,162,043 to Gellert.

It is often advantageous for the collar to be a separate part that is not attached to the nozzle. Such a collar is shown in FIG. 1. Using a separate collar has the advantage that it eliminates the need to braze the collar to the nozzle, which is a time consuming and expensive process. In addition, the need for different sized collars can be accommodated very quickly. The collar can easily be replaced to suit different injection molding applications. For example, if more insulation between the nozzle and the mold plates is desired, a collar comprised of any suitable material, such as titanium, Vespel, or a ceramic may be used instead of a steel collar.

U.S. Pat. No. 6,062,846 discloses a separate collar that surrounds a nozzle. The collar aligns the nozzle relative to the mold gate by having a large surface area that is in contact with the nozzle. The collar is effective for aligning the nozzle, however, the large contact area between the collar and nozzle facilitates heat loss from the nozzle.

In order to minimize the heat loss from the nozzle 118, it is necessary to minimize the amount of contact between the collar and the nozzle. However, as a result of the minimal contact between the collar and the nozzle, it is difficult to properly align the collar with the nozzle.

Referring to FIG. 1, a prior art injection molding apparatus is generally shown at 10. The injection molding apparatus 10 comprises a manifold 12 having a manifold melt channel 14 for receiving a melt stream of moldable material under pressure from a machine nozzle (not shown). A nozzle 18 having a nozzle channel 22 is coupled to the manifold 12 to receive the melt stream therefrom and deliver the melt through a mold gate 24, which is provided in a mold plate 32, to a mold cavity 34. The mold plate 32 is located between the manifold 12 and the mold cavity 34 and includes a recess 36 for receiving the nozzle 18. A shoulder 38 is formed on an inner wall 40 of the recess 36.

A generally cylindrical collar 42 surrounds a portion of the nozzle 18. The collar 42 is sandwiched between a nozzle head 26 and the shoulder 38 of the mold plate 32 to align the nozzle 18 with the mold gate 24. The amount of contact between collar 42 and the nozzle 18 is minimized in order minimize the amount of heat loss from the nozzle 18.

During assembly of the injection molding apparatus 10, the nozzle 18 and collar 42 are lowered as a unit into the recess 36 of the mold plate 32. The nozzle 18 and collar 42 must be lowered carefully into the recess 36 to ensure that the nozzle 18 is properly aligned with the mold gate 24. Due to the minimal contact between the collar and the nozzle, the collar often moves or tips relative to the nozzle during assembly. Any relative movement between the nozzle 18 and the collar 42 results in misalignment of the nozzle 18. Often considerable time and effort is required by an operator to properly align the nozzle 18 with the mold gate 24.

It is therefore an object of the present invention to provide an improved alignment collar that obviates or mitigates at least one of the above disadvantages.

SUMMARY OF THE INVENTION

According to an aspect of the present invention there is provided an injection molding apparatus comprising:

a manifold having a manifold channel for receiving a melt stream of moldable material under pressure;

a nozzle having a nozzle channel for receiving the melt stream from the manifold channel, the nozzle including a nozzle head, a nozzle body, and a nozzle tip;

a mold plate located between the manifold and a mold cavity, the mold plate including a recess for receiving the nozzle, the recess having shoulder;

a mold gate formed in the mold plate between the nozzle tip and the mold cavity, the mold gate being selectively openable to allow melt to flow from the nozzle channel into the mold cavity;

a collar sandwiched between the nozzle head and the shoulder for locating the nozzle relative to the mold plate, the collar including a flange for mating with the nozzle head and at least a portion of the nozzle body; and an alignment flange coupled to an inner surface of the collar for abutting the nozzle body, the alignment flange being spaced from the nozzle head;

wherein the alignment flange contacts the nozzle body to balance a tipping force exerted by the collar relative to the nozzle during assembly of the injection molding apparatus.

According to another aspect of the present invention there is provided a collar for an injection molding apparatus, the collar comprising:

a generally cylindrical body;

a first flange extending inwardly from an inner wall of the generally cylindrical body, the first flange for mating with a nozzle head and at least a portion of a nozzle body of a nozzle;

an alignment flange coupled to an inner wall of the generally cylindrical body, the alignment flange being spaced from the flange;

wherein the alignment flange is for contacting the nozzle body to restrict tipping of the collar relative to the nozzle during assembly of the injection molding apparatus.

According to another aspect of the present invention there is provided an injection molding apparatus comprising:

a manifold having a manifold channel for receiving a melt stream of moldable material under pressure;

a nozzle having a nozzle channel for receiving the melt stream from the manifold channel, the nozzle including a nozzle head, a nozzle body, and a nozzle tip;

a mold plate located between the manifold and a mold cavity, the mold plate including a recess for receiving the nozzle, the recess having shoulder;

a mold gate formed in the mold plate between the nozzle tip and the mold cavity, the mold gate being selectively openable to allow melt to flow from the nozzle channel into the mold cavity;

a collar sandwiched between the nozzle head and the shoulder for locating the nozzle relative to the mold plate, the collar including a flange for mating with the nozzle head and at least a portion of the nozzle body; and an alignment flange provided between an inner wall of the collar and the nozzle body, the alignment flange being spaced from the nozzle head;

wherein the alignment flange balances a tipping force exerted by the collar relative to the nozzle when the nozzle is lowered into the recess of the mold plate during assembly.

According to another aspect of the present invention there is provided a hot runner nozzle comprising:

a nozzle body having an outer surface and a nozzle head;

a collar abutting at least a portion of the nozzle head; an alignment flange located between the collar and the nozzle outer surface, the alignment flange being spaced from the nozzle head to restrict tipping of the collar relative to the nozzle body.

BRIEF DESCRIPTION OF THE DRAWINGS

Embodiments of the present invention will now be described more fully with reference to the accompanying drawings.

DETAILED DESCRIPTION OF THE PREFERRED EMBODIMENTS

Figure 1:
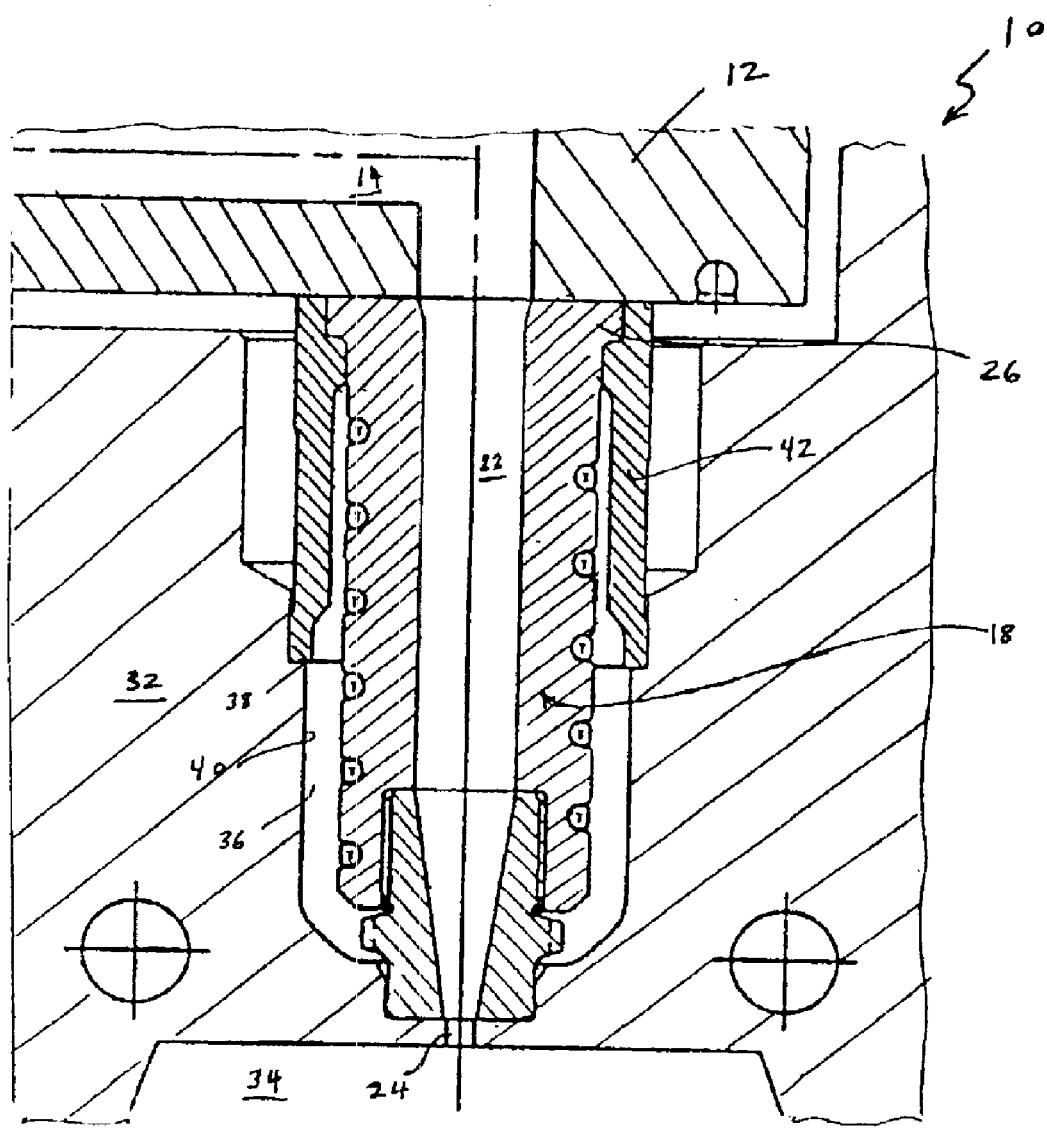
FIG. 1 is a side sectional view of a portion of a prior art injection molding apparatus.

To simplify the description, the numerals used previously in describing FIG. 1 will be used again after raising the numerals by 100 where the parts to be described correspond to parts already described.

Figure 2:
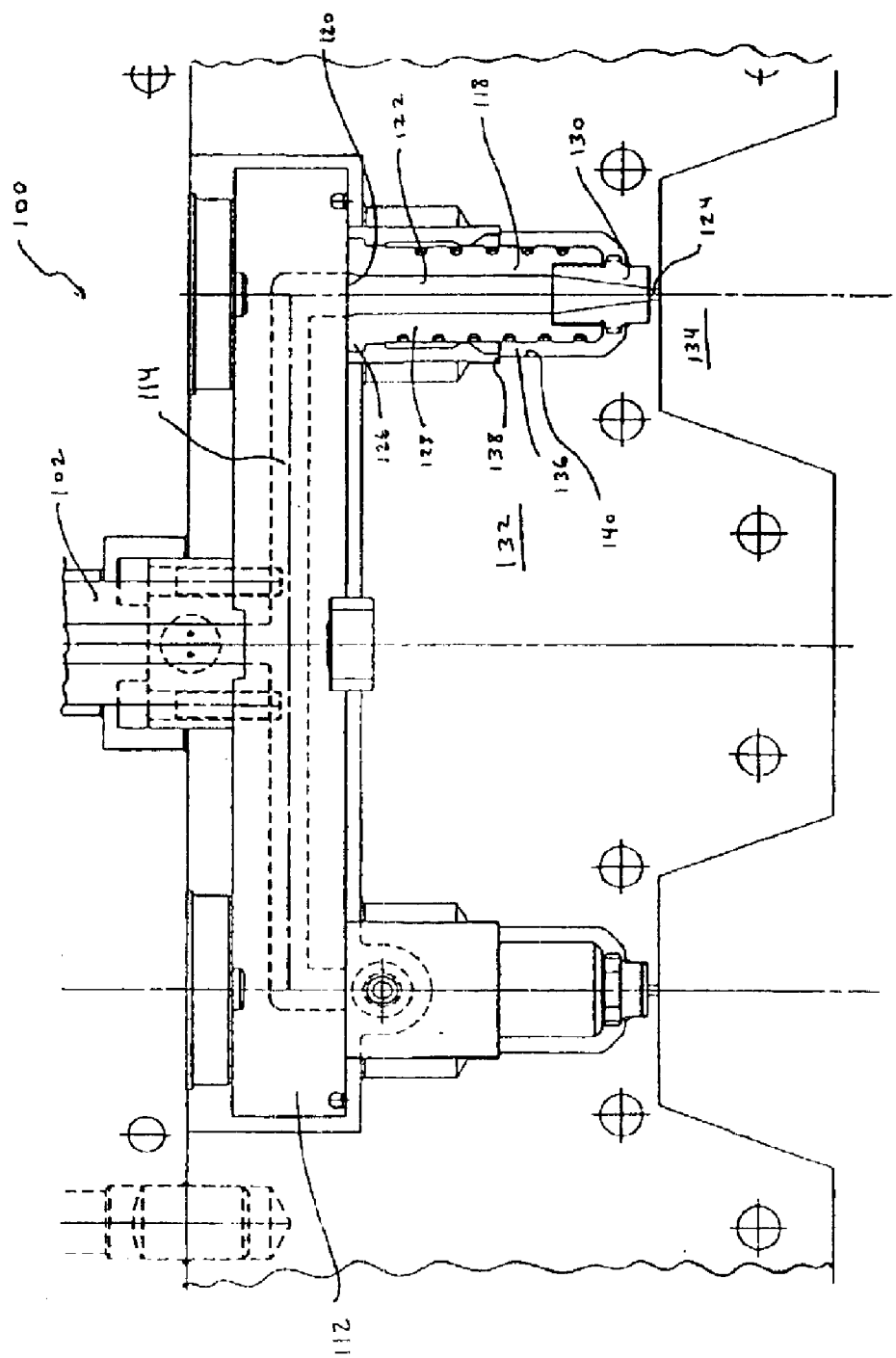
FIG. 2 is a side sectional view of an injection molding apparatus according to an embodiment of the present invention.

Referring to FIG. 2, an injection molding apparatus is generally shown at 100. The injection molding apparatus 100 comprises a manifold 112 having a manifold melt channel 114 for receiving a melt stream of moldable material under pressure from a sprue bushing 102 that is coupled to a machine nozzle (not shown).

Nozzles 118 are coupled to respective outlets 120 of the manifold 112. A nozzle channel 122 extends through each nozzle 118 for receiving the melt stream of moldable material from the manifold 12. Each nozzle 118 includes a nozzle head 126, a nozzle body 128 and a nozzle tip 130. The nozzle channels 22 are in communication with respective mold gates 124, which are openable to allow delivery of the melt stream to mold cavities 134.

Each nozzle 118 is received in a respective recess 136 of a mold plate 132, which is located between the manifold 112 and the mold cavities 134. The recess 136 includes a shoulder 38 that extends from an inner wall 140 thereof. A portion of the mold plate 132, through which the mold gates 124 extend, is located between the nozzles 18 and the mold cavities 134.

Figure 3:
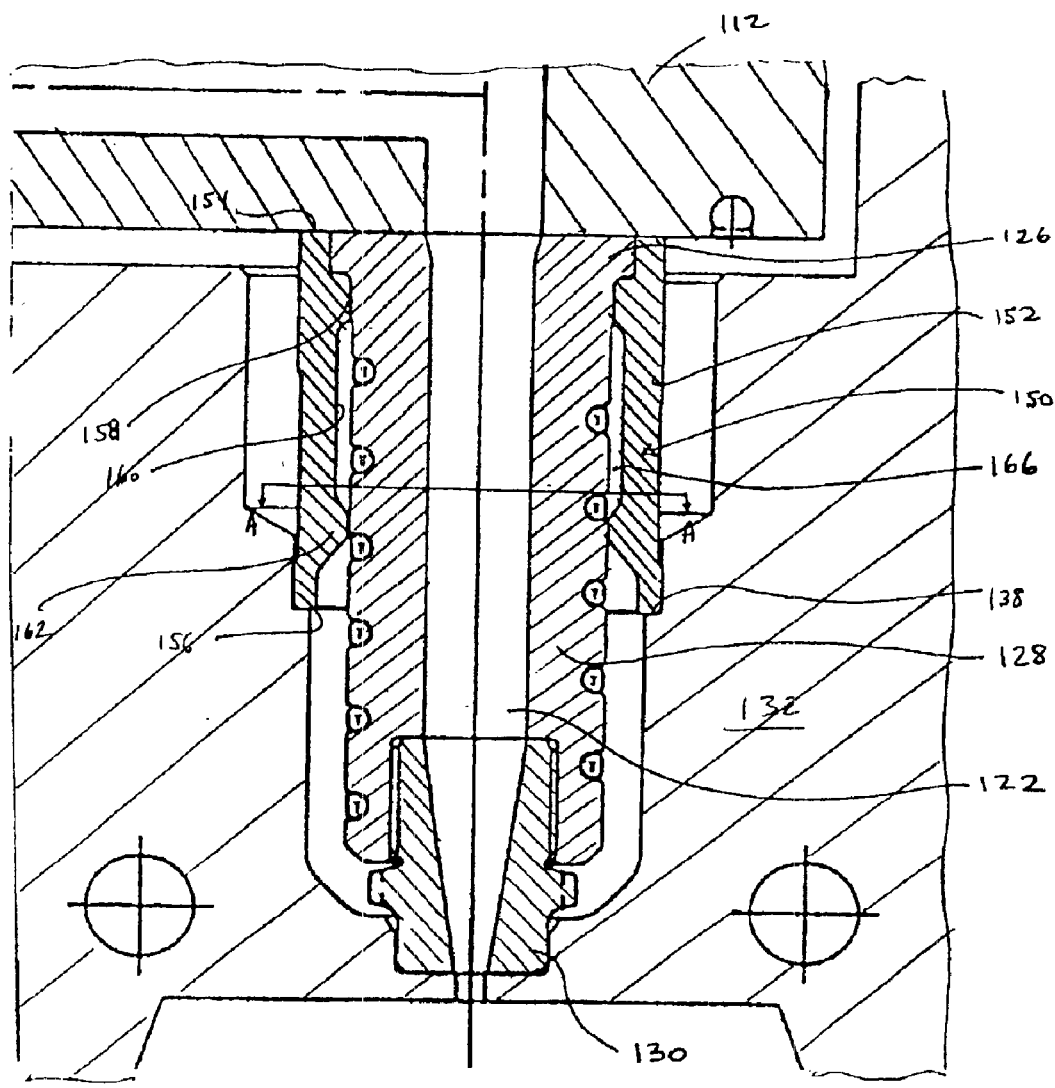
FIG. 3 is an enlarged view of a portion of FIG. 2.

A collar 150 is sandwiched between the nozzle head 126 and the shoulder 138. The collar 150 includes a generally cylindrical collar body 152 having a first end 154 and a second end 156, as shown in FIG. 3. A flange 158, which is located adjacent the first end 154 of the collar body 152, extends inwardly from an inner wall 160 of the collar body 152 to abut the nozzle head 126 and a portion of the nozzle body 128. The collar 150 is a separate part and is movable relative to the nozzle 118.

The collar 150 is made of a material suitable for withstanding the molding conditions. In some cases, the collar 150 is made of a material having a low thermal conductivity such as titanium or ceramic, for example.

An alignment flange 162 projects from the inner wall 160 of the collar body 152 adjacent the second end 156 thereof.

As shown, the alignment flange 162 is spaced from the flange 158. An insulation cavity 166 is provided between the inner wall 160 of the collar 150, between the alignment flange 162 and the flange 158, and the nozzle body 128. The alignment flange 162 abuts the nozzle body 118 to restrict tipping of the collar 150 relative to the nozzle 18.

Figure 4:
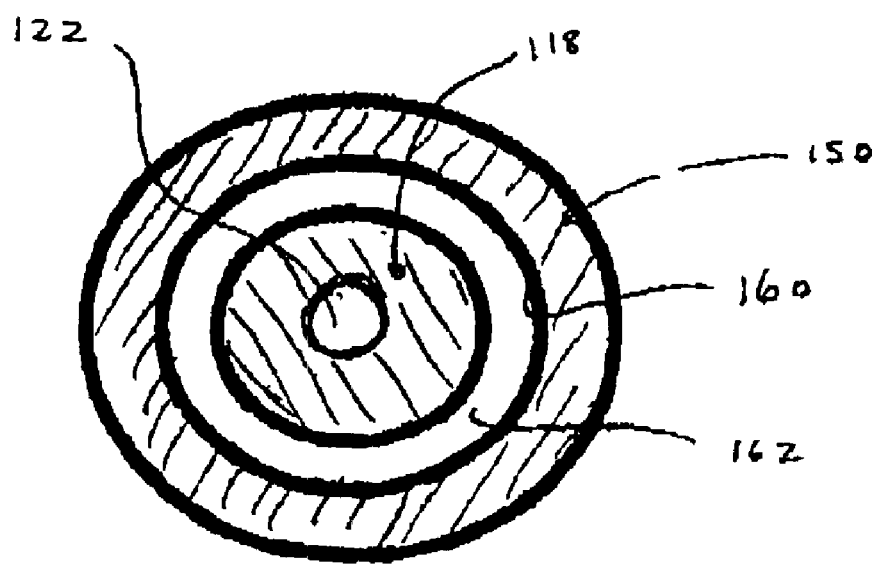
FIG. 4 is a view on A—A of FIG. 3.
Figure 5:
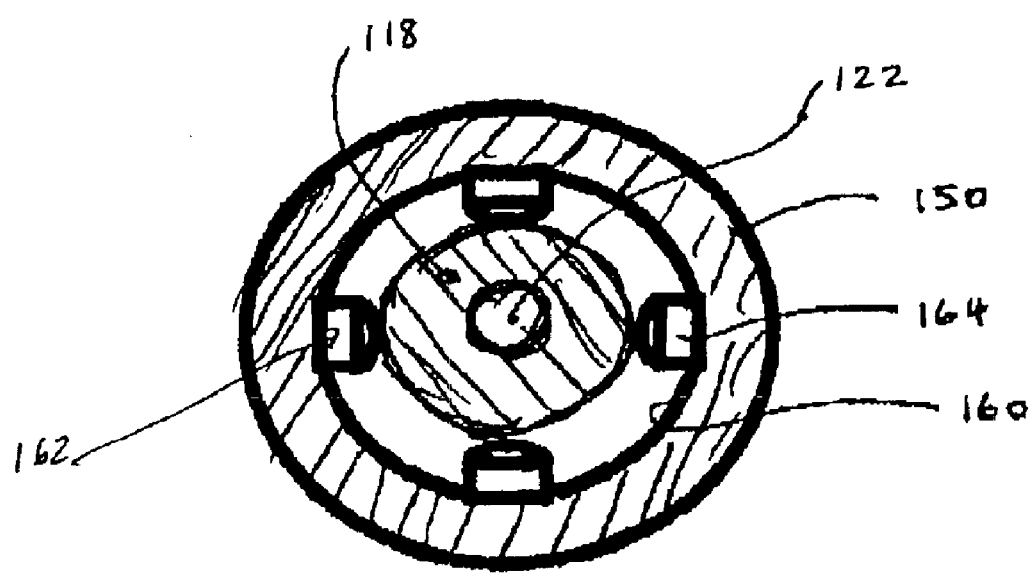
FIG. 5 is a view similar to FIG. 4 of another embodiment of the present invention.

Referring to FIG. 4, the alignment flange 162 is shown in greater detail. The alignment flange 162 is continuous and extends around the inner wall 160 of the collar 150. Alternatively, as shown in FIG. 5, the alignment flange 162 may include a series of individual projections 164, at spaced intervals, that extend inwardly to abut the nozzle 118. By minimizing the amount of contact between the collar 150 and the nozzle 118, the heat loss from the nozzle 118 is minimized. The higher the ratio of nozzle diameter to surface area in contact with the nozzle, the greater the heat loss from the nozzle 118. Therefore, the alignment flange 162 of FIG. 5 is more desirable from a heat loss perspective because it provides a reduced contact surface between the heated nozzle 118 and the collar 150, which contacts the cold mold plate 132.

During assembly of the injection molding apparatus 100, the collar 150 is slid onto the nozzle 118 to bring flange 158 into abutment with the nozzle head 126 and a portion of the nozzle body 128. The nozzle 118 and collar 150 are then lowered into the recess 136 as a unit, or an aligned assembly. The nozzle 118 and collar 150 are lowered until the second end 156 of the collar 150 contacts the shoulder 138 of the mold plate 132 and the nozzle tip 130 is aligned with the mold gate 124. Because of the alignment flange 162 contacting the nozzle body 128, generally no tipping of the collar 150 relative to the nozzle 118 occurs during assembly.

Figure 6:
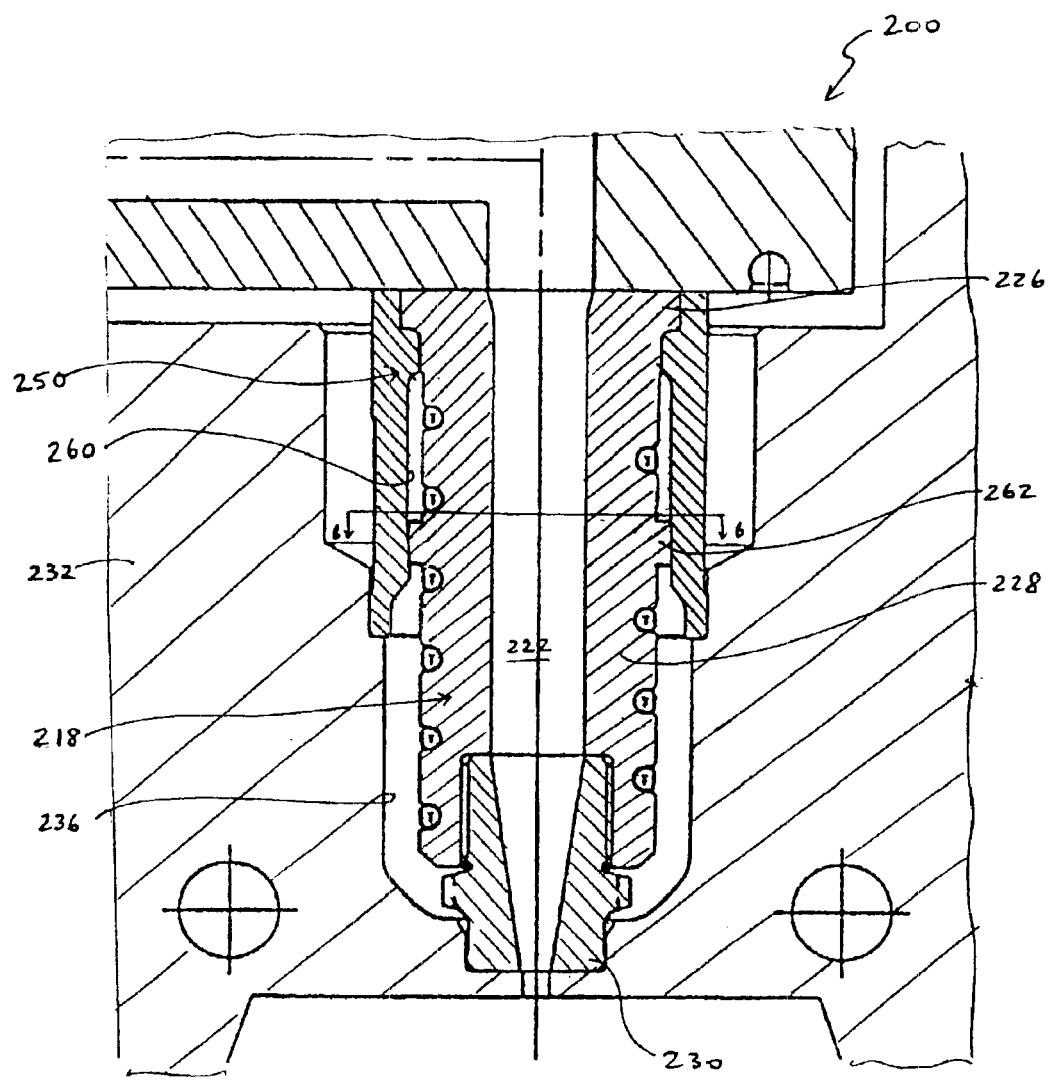
FIG. 6 is a side sectional view of a portion of an injection molding apparatus according to another embodiment of the present invention.
Figure 7:
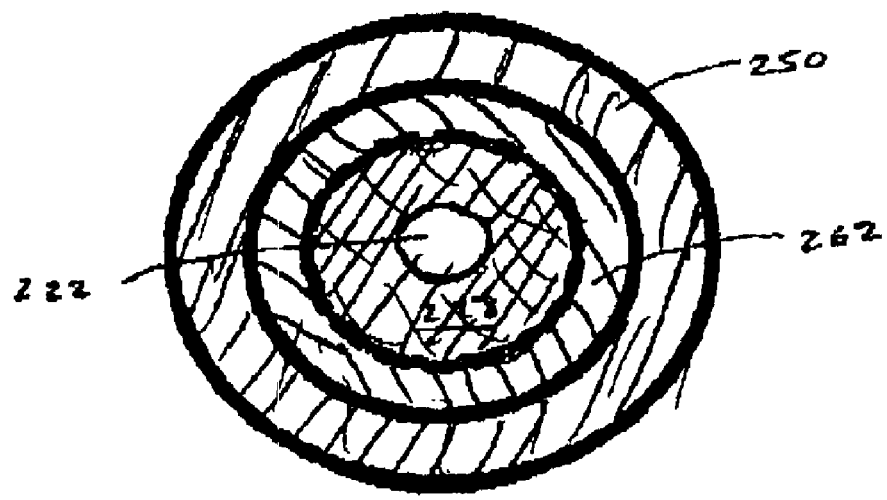
FIG. 7 is a view on B—B of FIG. 6.
Figure 8:
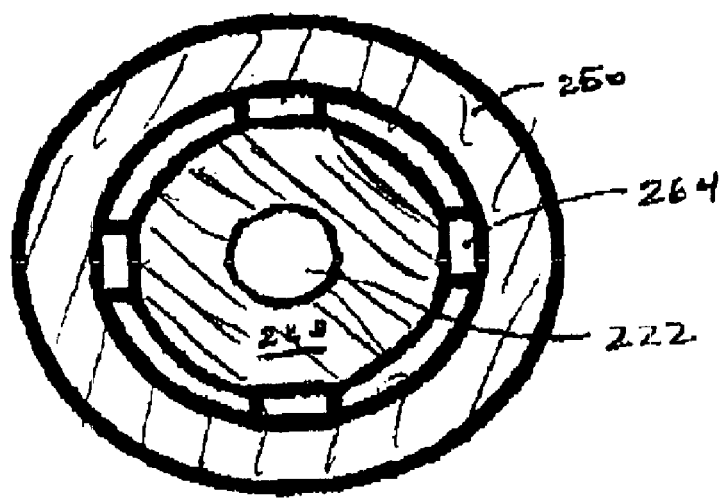
FIG. 8 is a view similar to FIG. 7 of another embodiment of the present invention.

Referring to FIG. 6, another embodiment of an injection molding apparatus 200 is shown. As shown, a nozzle 218 having a nozzle head 226, a nozzle body 228 and a nozzle tip 230 is received within a recess 236 of a mold plate 232. The nozzle includes an alignment flange 262 that projects from the nozzle body 228 to contact an inner wall 260 of a collar 250. As shown in FIG. 7, the alignment flange 262 is continuous and extends around the circumference of the nozzle body 228. Alternatively, as shown in FIG. 8, the alignment flange 262 may include a series of individual projections 264 that extend outwardly to abut the inner wall 260 of the collar 250.

Figure 9:
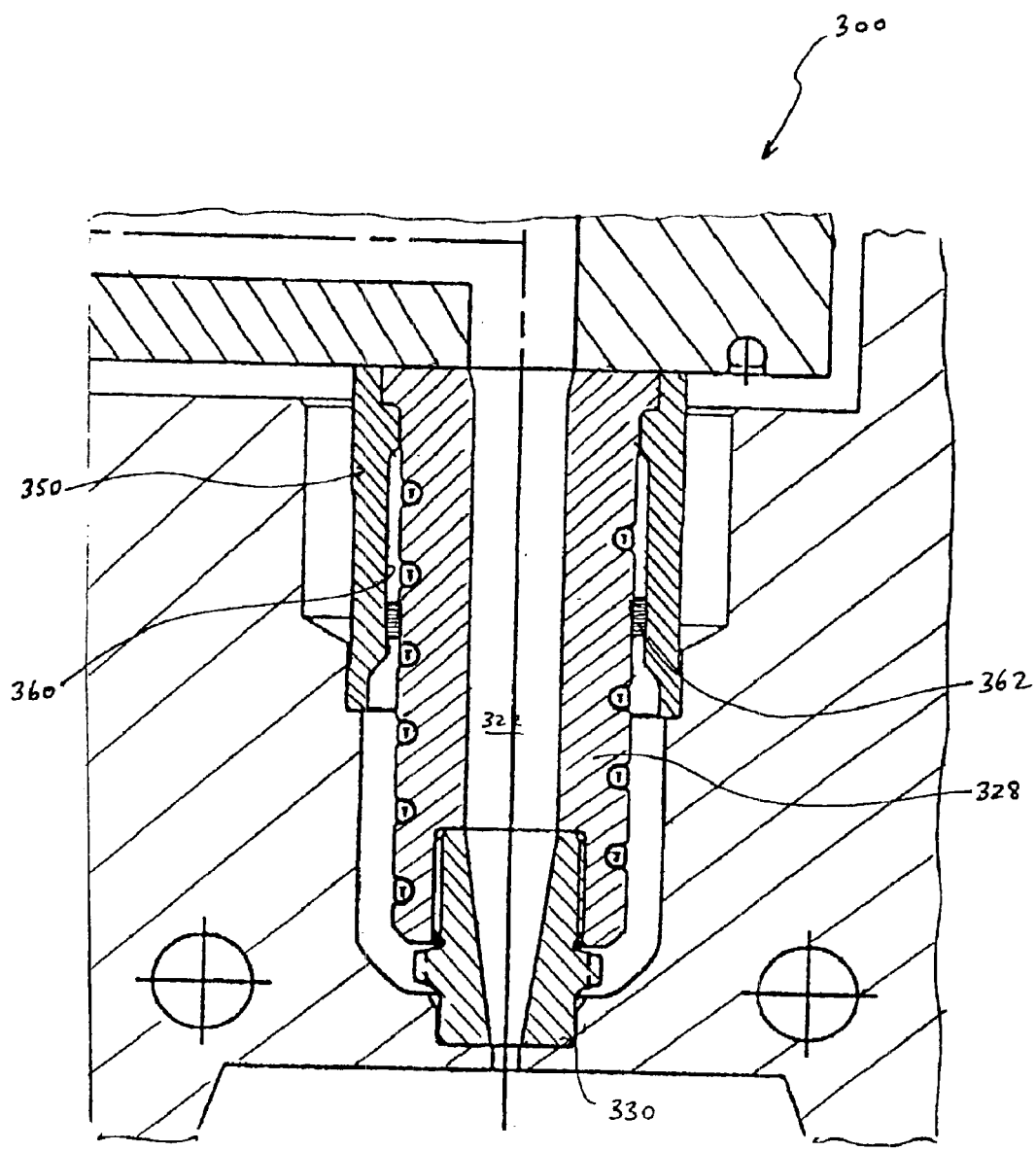
FIG. 9 is a side sectional view of a portion of an injection molding apparatus according to yet another embodiment of the present invention.

Referring to FIG. 9, another embodiment of an injection molding apparatus 300 is shown. In this embodiment, the alignment flange 362 is a separate part. The alignment flange 362 is generally ring shaped and is secured to either a nozzle body 328 or an inner wall 360 of a collar 350. The alignment flange 362 may be secured by brazing, for example, or any other suitable means.

In an alternative embodiment, a groove (not shown) is formed in either the nozzle body 328 or the inner wall 360 to receive the alignment flange 362. The alignment flange 362 may be a split ring having spring characteristics that is clamped in the groove. The alignment flange 362 is comprised of any suitable material. In some cases, the alignment flange 362 is made of an insulating material, such as any steel that is less conductive than the nozzle body, titanium or a ceramic, for example.

Figure 10:
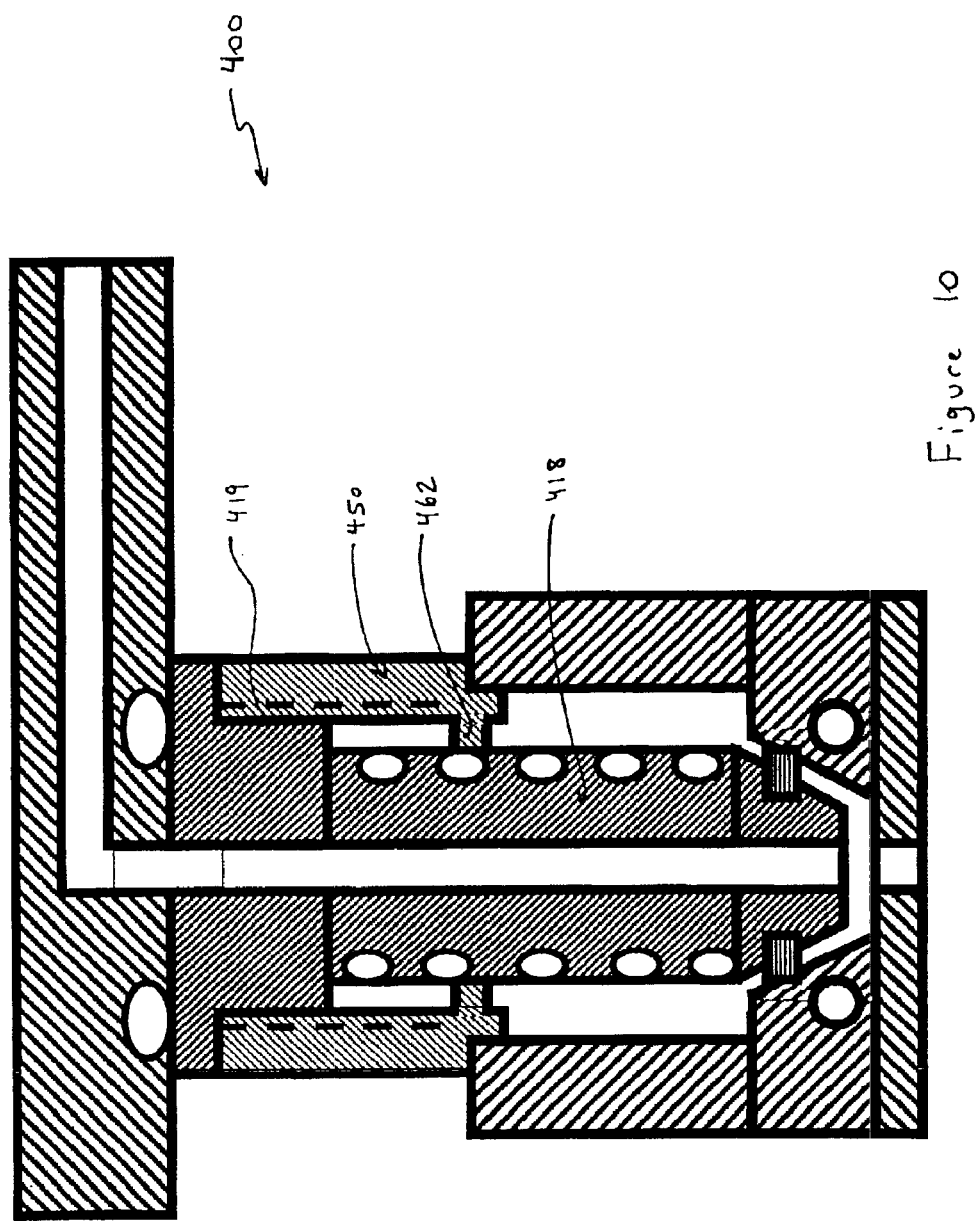
FIG. 10 is a side sectional view of a portion of an injection molding apparatus according to yet another embodiment of the present invention.

FIG. 10 shows another embodiment of an injection molding apparatus 400 in which a collar 450 is threaded to removably engage a threaded outer surface 419 of a nozzle 418. The collar 450 includes an alignment flange 462 for restricting tipping movement of the collar 450 relative to nozzle 418. The alignment flange 462 supplements the alignment achieved by the threaded connection between the collar 450 and the nozzle 418 to ensure that the two components are properly aligned.

Figure 11:
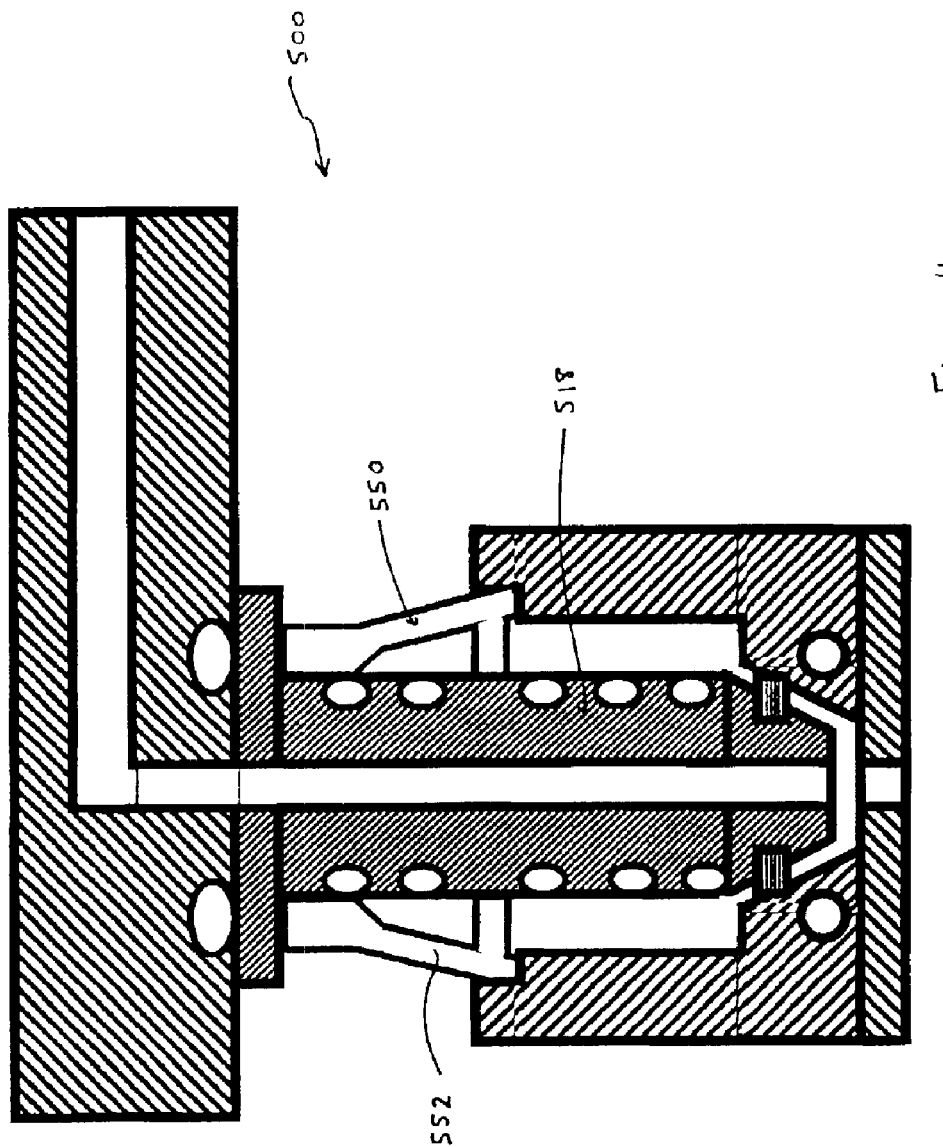
FIG. 11 is a side sectional view of a portion of an injection molding apparatus according to still another embodiment of the present invention.

FIG. 11 shows yet another embodiment of an injection molding apparatus 500 in which a collar 550 has an outwardly extending collar body 552. The collar 550 includes an alignment flange 562 for restricting tipping movement of the collar 550 relative to nozzle 518.

Figure 12:
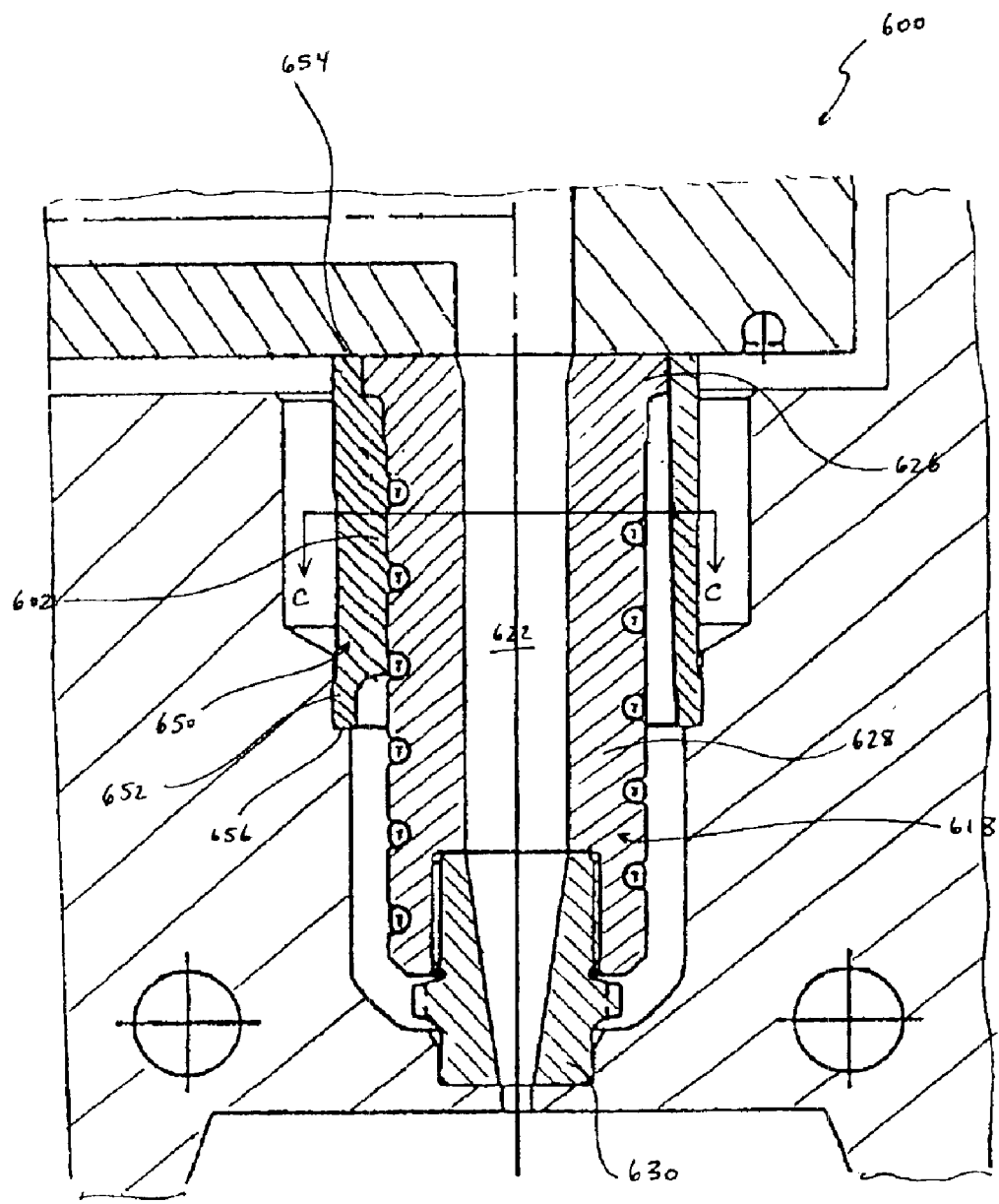
FIG. 12 is a side sectional view of a portion of an injection molding apparatus according to another embodiment of the present invention.
Figure 13:
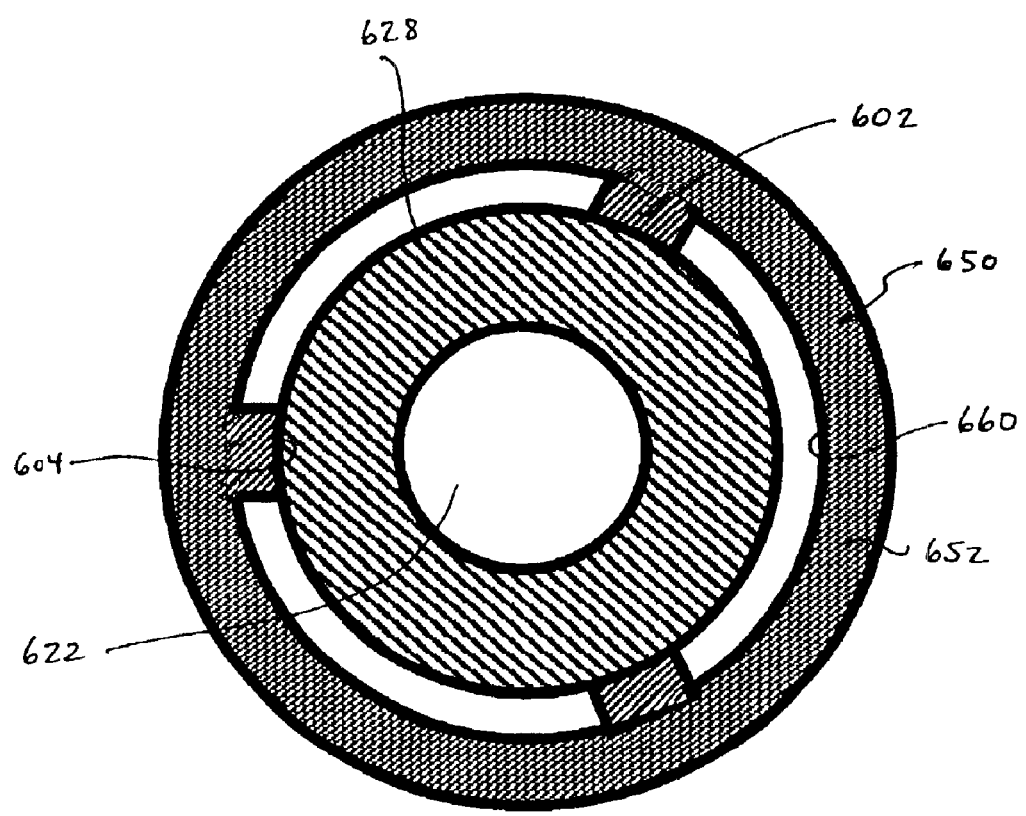
FIG. 13 is a view on C—C of FIG. 12.

Referring to FIG. 12, another embodiment of an injection molding apparatus 600 is shown. A collar 650 includes a generally cylindrical collar body 652 having a first end 654 and a second end 656. As shown in FIG. 13, alignment flanges take the form of ribs 602 that extend inwardly from an inner wall 660 of the collar body 652 to abut a portion of a nozzle head 626 and a nozzle body 628 of a nozzle 618. The ribs 602 are equally spaced about the inner wall 660 of the collar 650 and include a contact surface 604 for contacting the nozzle 618. The ribs 602 extend in a generally axial direction along the inner wall 660 of the collar 650. The number of ribs 602 may be increased in order to suit any injection molding application.

Figure 14:
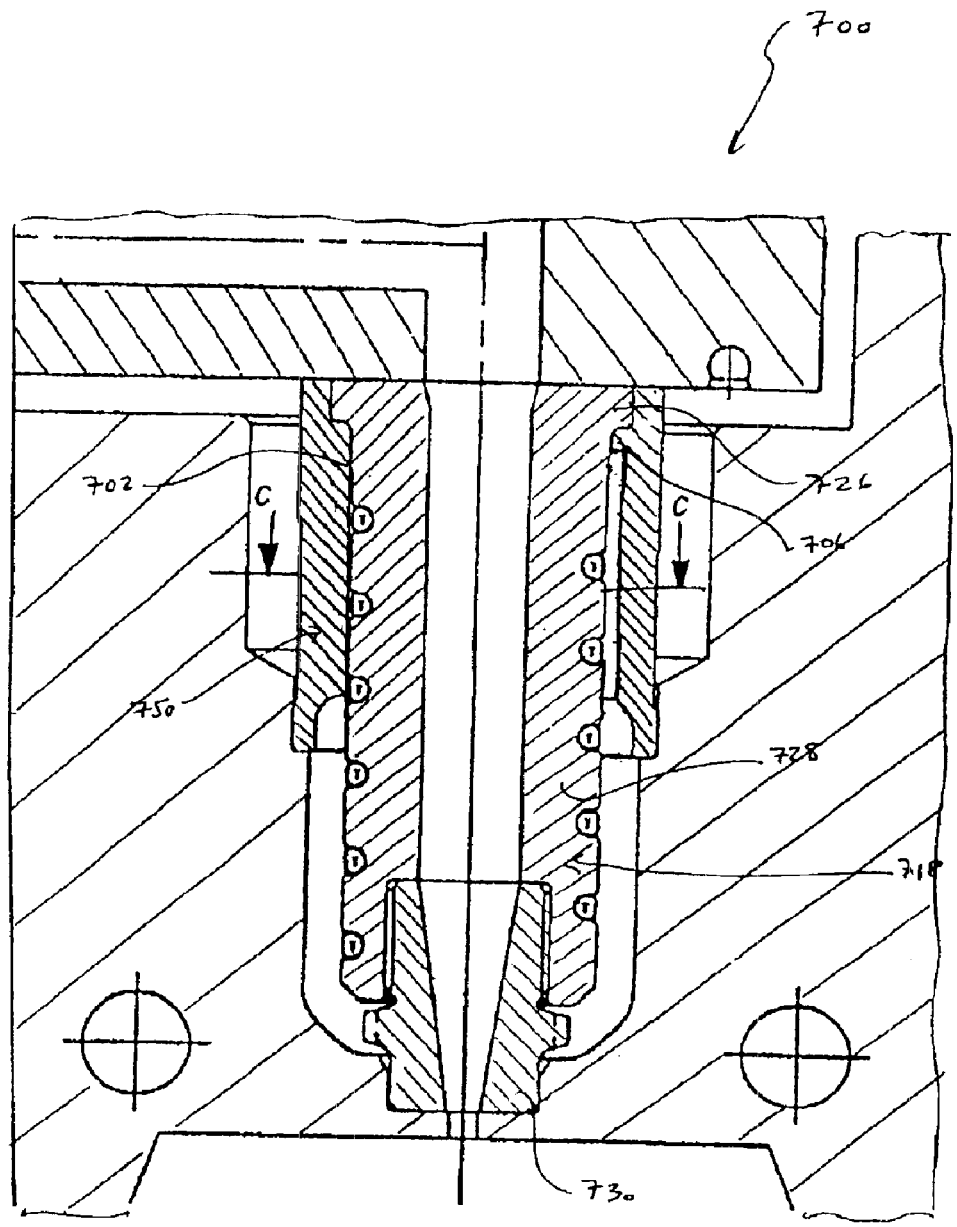
FIG. 14 is a side sectional view of a portion of an injection molding apparatus according to another embodiment of the present invention.

Another embodiment of an injection molding apparatus 700 is shown in FIG. 14. A collar 750, which is similar to the collar 650 of FIG. 12, further includes a flange 706 that surrounds at least a portion of a nozzle body 728 adjacent a nozzle head 726 of a nozzle 718. The flange 706 may be continuous about the circumference of the nozzle body 728 or, alternatively, the flange 706 may be comprised of a series of smaller flanges that contact the nozzle body 728. The flange 706 supplements the alignment provided by ribs 702.

It will be appreciated by a person skilled in the art of injection molding that any of the alignment flange embodiments disclosed herein can be used on either the nozzle or the collar to align the collar with respect to the nozzle.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of aligning a collar with a hot runner nozzle comprising:

providing a hot runner nozzle having a nozzle head and a nozzle body;

providing a collar having an alignment flange;

aligning said nozzle with said collar; and sliding said collar onto said nozzle body, said alignment flange contacting said nozzle body while said collar is slid onto said nozzle body and being spaced from said nozzle head when said collar is slid onto said nozzle;

wherein contact between said alignment flange and said nozzle body causes said collar to be aligned with said hot runner nozzle to provide an aligned assembly, and said contact occurs at spaced intervals around the circumference of said nozzle body.

2. The method according to claim 1, wherein said aligned assembly is installed in an injection molding apparatus.

3. The method according to claim 1, wherein said contact occurs on several rib surfaces that are spaced from one another.

4. The method according to claim 1, wherein said alignment flange includes a plurality of surfaces.

5. A method of aligning a collar with a hot runner nozzle comprising:
providing a hot runner nozzle having a nozzle head and a nozzle body, said nozzle body having an alignment flange;
providing a collar;
aligning said hot runner nozzle with said collar; and
sliding said collar onto said nozzle body;
wherein contact between said alignment flange and said collar causes said collar to be aligned with said hot runner nozzle to provide an aligned assembly, and said contact occurs at spaced intervals around the circumference of said nozzle body.

6. The method according to claim 5, wherein said aligned assembly is installed in an injection molding apparatus.

7. The method according to claim 5, wherein said contact occurs on several rib surfaces that are spaced from one another.

8. The method according to claim 5, wherein said alignment flange includes a plurality of surfaces.

9. A collar for an injection molding apparatus comprising:
a generally cylindrical body;
a first flange extending inwardly from an inner wall of said generally cylindrical body, said first flange for mating with a nozzle head and at least a portion of a nozzle body of a nozzle; and
an alignment flange coupled to said inner wall of said generally cylindrical body, said alignment flange being spaced from said first flange;
wherein said alignment flange comprises a series of projections provided at spaced intervals around the circumference of said inner wall.

10. A collar for an injection molding apparatus comprising:
a generally cylindrical body;
a first flange extending inwardly from an inner wall of said generally cylindrical body, said first flange for mating with a nozzle head and at least a portion of a nozzle body of a nozzle; and
an alignment flange coupled to said inner wall of said generally cylindrical body, said alignment flange being spaced from said first flange;
wherein said alignment flange comprises at least three ribs axially extending provided at spaced intervals around the circumference of said inner wall.

11. An injection molding apparatus comprising:
a manifold having a manifold channel for receiving a melt stream of moldable material under pressure;
a nozzle having a nozzle channel for receiving the melt stream from said manifold channel, said nozzle including a nozzle head, a nozzle body, and a nozzle tip;
a mold plate located between said manifold and a mold cavity, said mold plate including a recess for receiving said nozzle, said recess having a shoulder;
a mold gate formed in said mold plate between said nozzle tip and said mold cavity, said mold gate being selectively openable to allow melt to flow from said nozzle channel into said mold cavity;
a collar sandwiched between said nozzle head and said shoulder for locating said nozzle relative to said mold plate, said collar including a flange for mating with said nozzle head and at least a portion of said nozzle body; and
a separate alignment flange provided between an inner wall of said collar and said nozzle body.

12. The injection molding apparatus according to claim 11, wherein said alignment flange coupled to said inner wall.

13. The injection molding apparatus according to claim 11, wherein said alignment flange is coupled to said nozzle body.

14. A hot runner nozzle comprising:
a nozzle body having an outer surface;
a nozzle tip;
a nozzle head;
a collar abutting at least a portion of said nozzle head; and
an alignment flange located between said collar and said nozzle body outer surface, said alignment flange being disposed at a location spaced from both said nozzle head and said nozzle tip to restrict tipping of said collar relative to said nozzle body,
wherein said alignment flange is a separate part.

15. The hot runner nozzle according to claim 14, wherein said collar is made of a less thermally conductive material than said nozzle.

16. The hot runner nozzle according to claim 14, wherein said alignment flange is made of less thermally conductive material than said nozzle.

17. An injection molding apparatus comprising:
a manifold having a manifold channel;
a nozzle having a nozzle channel in fluid communication with said manifold channel, said nozzle including a nozzle head, a nozzle body, and a nozzle tip;
a mold plate located between said manifold and a mold cavity, said mold plate including a recess for receiving said nozzle, said recess having a shoulder;
a mold gate formed in said mold plate between said nozzle tip and said mold cavity, said mold gate being selectively openable to allow fluid communication between said mold cavity and said nozzle channel;
a collar sandwiched between said nozzle head and said shoulder for locating said nozzle relative to said mold plate, said collar including a flange for mating with said nozzle head and at least a portion of said nozzle body, wherein the collar contacts said mold plate at only one location; and
an alignment flange coupled to an inner surface of said collar and in contact with said nozzle body, the alignment flange being in contact with said nozzle body at a location spaced from said nozzle head,
wherein said alignment flange is a separate part.

18. The injection molding apparatus according to claim 17, wherein said collar is made of a less thermally conductive material than said nozzle.

19. The injection molding apparatus according to claim 17, wherein said alignment flange is made of less thermally conductive material than said nozzle.

* * * * *